US010246261B2

(12) United States Patent
Lofgren et al.

(10) Patent No.: US 10,246,261 B2
(45) Date of Patent: Apr. 2, 2019

(54) CONVEYOR BELT

(71) Applicant: ContiTech Transportbandsysteme GmbH, Hannover (DE)

(72) Inventors: Jeffery Lofgren, Lincoln, NE (US); Don Belik, Lincoln, NE (US); Douglas M. Gilg, Powell, OH (US)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 15/761,587

(22) PCT Filed: Sep. 29, 2016

(86) PCT No.: PCT/US2016/054465
§ 371 (c)(1),
(2) Date: Mar. 20, 2018

(87) PCT Pub. No.: WO2017/059081
PCT Pub. Date: Apr. 6, 2017

(65) Prior Publication Data
US 2018/0346249 A1    Dec. 6, 2018

Related U.S. Application Data

(60) Provisional application No. 62/234,301, filed on Sep. 29, 2015.

(51) Int. Cl.
*B65G 15/34*    (2006.01)
*A01F 15/18*    (2006.01)
(Continued)

(52) U.S. Cl.
CPC .............. *B65G 15/34* (2013.01); *A01F 15/18* (2013.01); *B32B 3/02* (2013.01); *B32B 5/024* (2013.01);
(Continued)

(58) Field of Classification Search
CPC ........ B65G 15/30; B65G 15/34; B32B 27/12; B32B 5/08; A01F 15/18; D03D 3/04
(Continued)

(56) References Cited

U.S. PATENT DOCUMENTS 3,872,735 A * 3/1975 Hnatek ..................... F16G 1/10
198/847
4,106,613 A * 8/1978 Thomson ............... B65G 15/34
198/847
(Continued)

*Primary Examiner* — James R Bidwell
(74) *Attorney, Agent, or Firm* — David L. Cate

(57) ABSTRACT

A conveyor belt including a pulley cover layer, a carry cover layer, and at least one reinforcement layer disposed within the belt between the pulley cover layer and the carry cover layer. The belt has a first edge section, a second edge section, and a load carrying section. The first edge section and the second edge section are located on each side of the conveyor belt, and the load carrying section is located between the first second edge sections. The reinforcement layer is comprised of a woven fabric which has weft threads extending across the width of the belt and passing into both the first edge section and the second edge section of the conveyor belt. The woven fabric also has warp threads located in the load carrying section of the conveyor belt extending longitudinally throughout the belt without passing into either the first or the second edge section.

20 Claims, 2 Drawing Sheets

(51) Int. Cl.
| | |
|---|---|
| *D03D 3/04* | (2006.01) |
| *B32B 5/08* | (2006.01) |
| *B32B 27/12* | (2006.01) |
| *B32B 5/02* | (2006.01) |
| *B32B 25/10* | (2006.01) |
| *B32B 25/12* | (2006.01) |
| *B32B 25/14* | (2006.01) |
| *B32B 25/16* | (2006.01) |
| *B32B 3/02* | (2006.01) |
| *D03D 1/00* | (2006.01) |

(52) U.S. Cl.
CPC ............... *B32B 5/08* (2013.01); *B32B 25/10* (2013.01); *B32B 25/12* (2013.01); *B32B 25/14* (2013.01); *B32B 25/16* (2013.01); *B32B 27/12* (2013.01); *D03D 3/04* (2013.01); *A01F 2015/183* (2013.01); *B32B 2250/40* (2013.01); *B32B 2250/44* (2013.01); *B32B 2262/0261* (2013.01); *B32B 2262/0276* (2013.01); *B32B 2262/062* (2013.01); *B32B 2262/14* (2013.01); *B32B 2270/00* (2013.01); *B32B 2274/00* (2013.01); *B32B 2307/732* (2013.01); *B32B 2433/02* (2013.01); *D03D 1/0094* (2013.01); *D10B 2331/02* (2013.01); *D10B 2331/04* (2013.01)

(58) Field of Classification Search
USPC .................................................. 198/846, 847
See application file for complete search history.

(56) References Cited

U.S. PATENT DOCUMENTS

| | | | | |
|---|---|---|---|---|
| 4,371,580 | A | * | 2/1983 | Morrison ................ A01F 15/07 198/847 |
| 4,900,609 | A | * | 2/1990 | Arnold .................... A01F 15/18 428/163 |
| 5,134,006 | A | | 7/1992 | Irvin |
| 5,422,165 | A | | 6/1995 | Arnold |
| 6,427,728 | B1 | * | 8/2002 | Maguire ................ B29C 70/22 198/847 |
| 7,074,729 | B2 | | 7/2006 | Leighton et al. |
| 2004/0161990 | A1 | * | 8/2004 | Leighton ................ B65G 15/34 442/164 |
| 2010/0243130 | A1 | * | 9/2010 | Hoffmann ............. B29D 29/06 156/137 |
| 2010/0300849 | A1 | | 12/2010 | Spence et al. |

\* cited by examiner

CONVEYOR BELT

RELATED APPLICATION INFORMATION

This patent application claims priority to U.S. Provisional Patent Application No. 62/234,301 filed Sep. 29, 2015, and Patent Cooperation Treaty (PCT) Patent Application No. PCT/US2016/054465, filed Sep. 29, 2016, the disclosures of which are incorporated herein in their entirety, by reference

FIELD

The field to which the disclosure generally relates is conveyor belts, and more particularly to conveyor belts with improved resistance to edge fraying.

BACKGROUND

This section provides background information to facilitate a better understanding of the various aspects of the disclosure. It should be understood that the statements in this section of this document are to be read in this light, and not as admissions of prior art.

In a variety of applications conveyor belts are utilized to move crops, vegetation, and other products. During use such belts repeatedly contact and rub against wheels, pulleys, rollers, and other machinery, as well as stone and organic matter collected from the surrounding environment. As a result of this repeated contact, it is common for belt edges to fray which may cause the belt to unravel. Fraying can be especially pronounced in the case of conveyor belts which become misaligned, unbalanced, or are otherwise unevenly worn.

When belt edges fray, loose strands of belt material become highly susceptible to snagging on machinery and other nearby structures. If loose strands of belt material catch upon such structures while the belt is in use, the strands can be torn from the belt and cause potentially irreparable damage to the belt, machinery, and the products the belt carried.

Problems of fraying and unraveling are inherent in conveyor belts, and especially baler belts. Baler bails are used to manipulate crops in one or more ways. In the context of a round hay baler, multiple belts (usually 4-8 belts) function to take and form incoming rows of crop into a spiral roll of increasing diameter. These belts must withstand incredible amounts of stress from exposure to the elements, such as rain and widely varying temperatures, as well as from stretching to accommodate incoming and large amounts of heavy crops.

U.S. Pat. No. 5,422,165 teaches that baler belts suffer from the heavy loads they are subjected to as they travel around the rollers when baling. The belt edges tend to stretch more than the center of the belt. This is due, at least in part, to an unbalance of load or force dissipation as the load shifts off the center of the belt. This unbalanced load results from the gaps between the belts in the hay baler. When the belts are acting as compressors on the hay bale, the hay tends to bulge out between the gaps resulting in greater stress on the edges of the belt and thus greater elongation. Belts used in agricultural applications and particularly in round, hay balers have inherent problems created by their usual process of manufacture. Moreover, the edges of cut-edge belts and other types of belts tend to curl up against the mechanical guides on the rollers which induces a great amount of stress and flexion at the edges of the belt and, thus, contributes to accelerated fatigue at the edges of the belt. The usual process of belt manufacture involves cutting a large processed sheet of elastomeric into relatively narrow strips which form the core of the belts. The belt disclosed by this patent utilize a wrap of fabric affixed around each longitudinal edge of the belt core. This wrapped belt core is then further processed to create belts with improved longevity and performance characteristics.

U.S. Pat. No. 4,371,580 teaches a three-ply belt having improved dimensional stability, flexing characteristics, and elongation characteristics. In at least one embodiment, a rubber cover is bonded to each outer ply to provide abrasion protection for the belt and to give the machinery on which the belt is used a surface to engage when the belt is in operation.

U.S. Pat. No. 4,900,609 teaches a two-ply belting having improved dimensional stability flexing characteristics and elongation characteristics. Belting in accordance with this invention may be either cut-edge or capped-edge belting. With cut edge belting, the fabrics of the plies are exposed along the edges of the belt. With capped-edge belting, a "cap" of rubber material is bonded to the edges of the belt.

Prior art belts, such as those described above, are not designed to resolve belt edge fraying problems. As a result of their design flaw, glue or covers are typically affixed to the edges of conveyor belts in an effort to slow inevitable edge fraying and the associated damage. Accordingly, there is a need for a conveyor belt which addresses belt edge fraying at its source by being designed to better resist belt edge fraying.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure are conveyor belts having a pulley cover layer, a carry cover layer, and at least one reinforcement layer disposed within the belt between the pulley cover layer and the carry cover layer. The belt comprises a first edge section, a second edge section, and a load carrying section, where the first edge section and the second edge section are located on opposing sides of the conveyor belt and the load carrying section is located between the first edge section and the second edge section. The reinforcement layer is comprised of a woven fabric having weft threads extending across the width of the belt and passing into both the first edge section and the second edge section, and the woven fabric has warp threads located in the load carrying section of the conveyor belt extending longitudinally throughout the belt without passing into either the first edge section or the second edge section of the conveyor belt, or otherwise void of warp threads in the first edge section or the second edge section.

In some aspects, the first edge section and the second edge section of the conveyor belt do not extend across more than 30% of the total width of the conveyor belt, or more than 20% of the total width of the conveyor belt, or even more than 10% of the total width of the conveyor belt. In some aspects, the first edge section and the second edge section each have a width of no more than 10 inches (254 mm), no more than 5 inches (127 mm), or even no more than 1 inch (25.4 mm). In some cases, the conveyor belt is a baler belt, and may be about 520 inches (13,208 mm) long and about 23 (584.2 mm) inches wide.

The woven fabric may be formed of a nylon material, a polyester material, a combination of a polyester material and a nylon material, or a polyaramid material. The pulley cover layer and the carry cover layer may each include one or more materials selected from natural rubber, synthetic polyisoprene rubber, cis-1,4-polybutadiene rubber, nitrile rubber, ethylene-propylene-diene rubber (EPDM), styrene-butadiene rubber (SBR), styrene-isoprene rubber (SIR), and styrene-isoprene-butadiene rubber (SIBR).

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and wherein.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
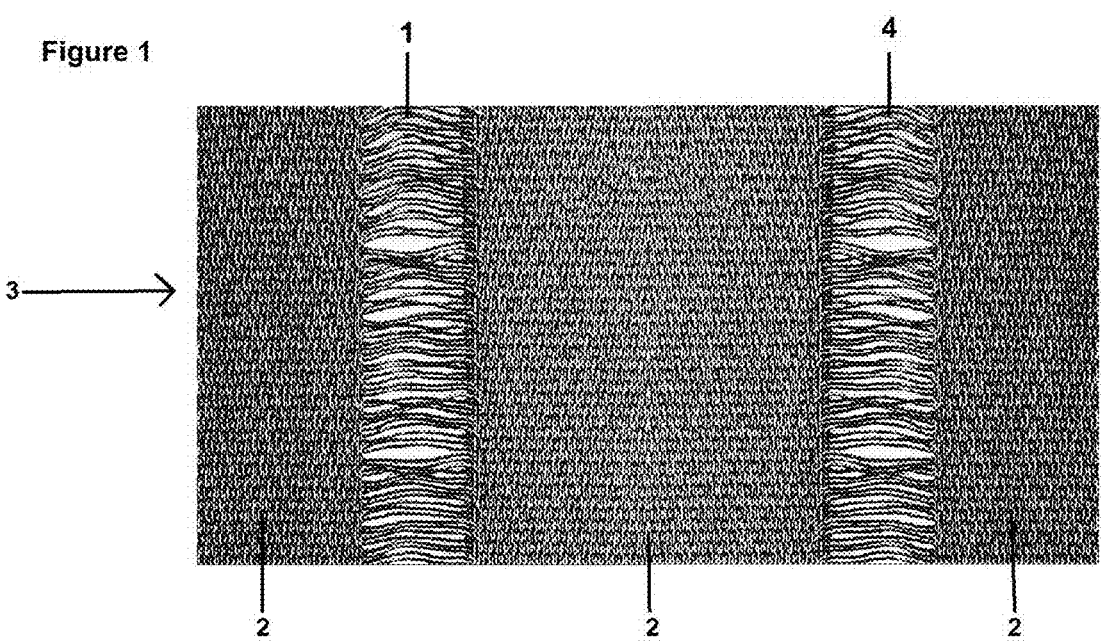
FIG. 1 shows woven fabric of a conveyor belt of according to the disclosure; and, FIG. 2 shows a reinforcement layer within a conveyor belt of according to the disclosure.

Now referencing FIG. 1, which shows the woven fabric 3 of a conveyor belt in an early stage of processing. Typically this fabric 3 may be formed from a nylon material, a polyester material, or a combination of the two; however, any appropriate fabrics may be used, including other fabrics such as, but not limited to polyaramid fabrics, cotton fabrics, and the like, or any suitable combinations thereof. The fabric is designed using both weft threads and warp threads. Weft threads are positioned horizontally throughout the width of the belt, and warp threads are positioned vertically throughout the length of the belt. In other words, the weft threads are perpendicular to the direction that the conveyor belt travels, and warp threads are parallel to the direction that the conveyor belt travels.

Predetermined areas of woven fabric 3 are void of warp threads, these areas represent the first edge section 1 and the second edge section 4 of a conveyor belt after the belt is cured. The remaining areas of the belt fabric contain both warp threads and weft threads, and these areas represent the load bearing section 2 of a conveyor belt after the belt is cured. More specifically, conveyor belts according to the disclosure have a first edge section 1 and a second edge section 4 on each side of the conveyor belt which are void of warp threads in the belt reinforcement layer; and conveyor belts of this invention have a load bearing section 2 located between the first edge section 1 and the second edge section 4 of the belt.

Figure 2:
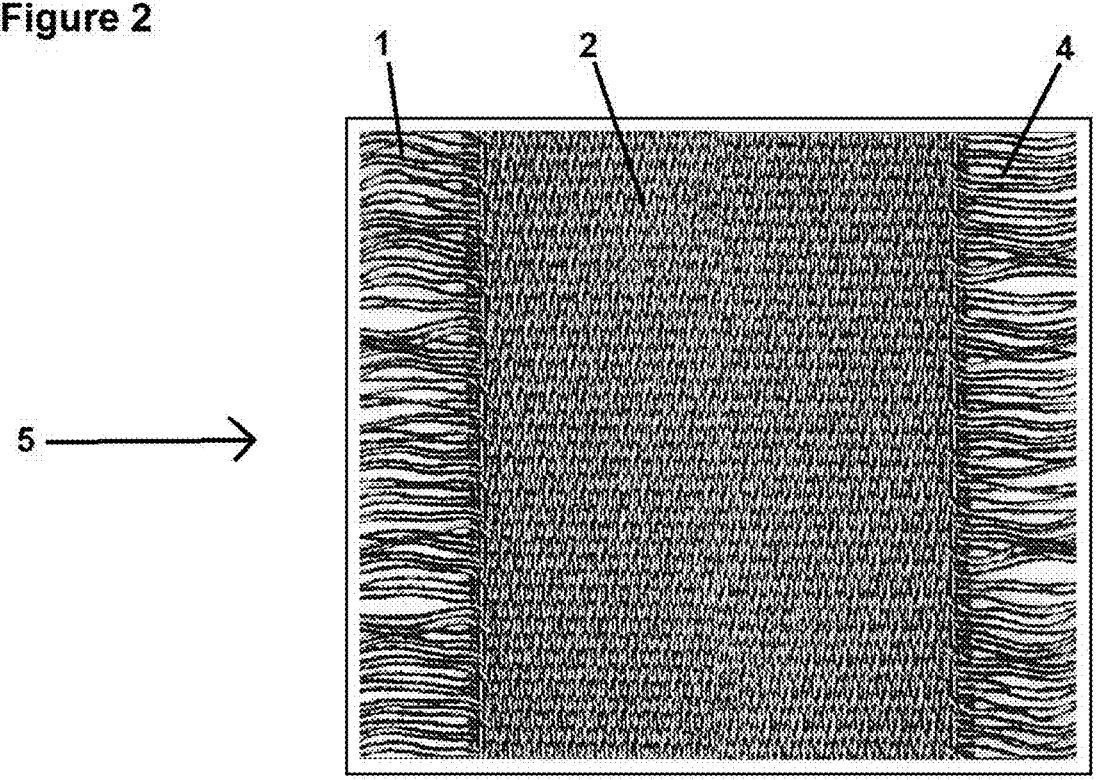

The woven fabric 3 is cut vertically along the areas void of warp threads 1, 4 to become conveyor belt reinforcement layers. FIG. 2 shows the reinforcement layer within a conveyor belt 5 of this invention. Conveyor belt reinforcement layers are located within the conveyor belt, between the conveyor belt pulley cover layer and the carry cover layer.

The conveyor belts of this invention can be baler belts used in agricultural machinery; such belts are about 520 inches (13,208 mm) long and about 23 (584.2 mm) inches wide. The carry cover layer and the pulley cover layer of these belts can be comprised of a wide variety of elastomeric materials, both synthetic and/or natural. For instance, these conveyor belt layers can be comprised of a thermoplastic elastomer or a cured rubber, although any suitable material is considered within the purview of the invention. Typically these conveyor belt layers are comprised of a vulcanized rubber, such as natural rubber, synthetic polyisoprene rubber, cis-1,4-polybutadiene rubber, nitrile rubber, ethylene-propylene-diene rubber (EPDM), styrene-butadiene rubber (SBR), styrene-isoprene rubber (SIR), styrene-isoprene-butadiene rubber (SIBR), or various blends thereof.

Each conveyor belt 5 formed from the woven fabric 3 has a first edge section 1 and a second edge section 4 which are each void of warp threads. In some embodiments of this invention the first edge section 1 and the second edge section 4 each have a width of no more than 1 inch (25.4 mm). Typically the first edge section 1 and the second edge section 4 each have a width of no more than 5 inches (127 mm). Preferably, the first edge section 1 and the second edge section 4 each have a width of no more than 10 inches (254 mm). In other embodiments of this invention the first edge section 1 and the second edge section 4 do not extend across more than 30% of the total width of the conveyor belt. Generally the first edge section 1 and the second edge section 4 do not extend across more than 20% of the total width of the conveyor belt. In some cases, the first edge section 1 and the second edge section 4 do not extend across more than 10% of the total width of the conveyor belt. The warp threads of the load bearing section 2 do not extend into either the first edge section 1 or the second edge section 4 of the conveyor belt 5.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A conveyor belt comprising a pulley cover layer, a carry cover layer, and at least one reinforcement layer disposed within the belt between the pulley cover layer and the carry cover layer, wherein the belt comprises a first edge section, a second edge section, and a load carrying section, wherein the first edge section and the second edge section are located on opposing sides of the conveyor belt and the load carrying section is located between the first edge section and the second edge section, wherein the reinforcement layer is comprised of a woven fabric comprising weft threads extending across the width of the belt and passing into both the first edge section and the second edge section, wherein the woven fabric has warp threads located in the load carrying section of the conveyor belt extending longitudinally throughout the belt without passing into either the first edge section or the second edge section of the conveyor belt, wherein the woven fabric consists of weft threads in the first edge section and the second edge section and warp threads and weft threads in the load carrying section, and wherein the first edge section and the second edge section of the conveyor belt do not extend across more than 30% of the total width of the conveyor belt.

2. The conveyor belt according to claim 1, wherein the first edge section and the second edge section of the conveyor belt do not extend across more than 20% of the total width of the conveyor belt.

3. The conveyor belt according to claim 2, wherein the first edge section and the second edge section of the conveyor belt do not extend across more than 10% of the total width of the conveyor belt.

4. The conveyor belt according to claim 1, wherein the conveyor belt is a baler belt.

5. The conveyor belt according to claim 1, wherein the belt is about 520 inches (13,208 mm) long.

6. The conveyor belt according to claim 1, wherein the belt is about 23 (584.2 mm) inches wide.

7. The conveyor belt according to claim 1, wherein the first edge section and the second edge section are devoid of warp threads.

8. The conveyor belt according to claim 1, wherein the first edge section and the second edge section each have a width of no more than 10 inches (254 mm).

9. The conveyor belt according to claim 8, wherein the first edge section and the second edge section each have a width of no more than 5 inches (127 mm).

10. The conveyor belt according to claim 9, wherein the first edge section and the second edge section each have a width of no more than 1 inch (25.4 mm).

11. The conveyor belt according to claim 1, wherein the woven fabric is formed of a nylon material.

12. The conveyor belt according to claim 1, wherein the woven fabric is formed of a polyester material.

13. The conveyor belt according to claim 1, wherein the woven fabric is formed of a polyester material and a nylon material.

14. The conveyor belt according to claim 1, wherein the woven fabric is formed of a polyester material.

15. The conveyor belt according to claim 1, wherein the pulley cover layer and the carry cover layer each comprise one or more materials selected from the group consisting of natural rubber, synthetic polyisoprene rubber, cis-1,4-polybutadiene rubber, nitrile rubber, ethylene-propylene-diene rubber (EPDM), styrene-butadiene rubber (SBR), styrene-isoprene rubber (SIR), and styrene-isoprene-butadiene rubber (SIBR).

16. A conveyor belt comprising a pulley cover layer, a carry cover layer, and at least one reinforcement layer disposed within the belt between the pulley cover layer and the carry cover layer, wherein the belt comprises a first edge section, a second edge section, and a load carrying section, wherein the first edge section and the second edge section are located on opposing sides of the conveyor belt and the load carrying section is located between the first edge section and the second edge section, wherein the reinforcement layer is comprised of a woven fabric comprising weft threads extending across the width of the belt and passing into both the first edge section and the second edge section, wherein the woven fabric has warp threads located in the load carrying section of the conveyor belt extending longitudinally throughout the belt without passing into either the first edge section or the second edge section of the conveyor belt, wherein the first edge section and the second edge section are devoid of warp threads, and wherein the woven fabric consists of weft threads in the first edge section and the second edge section and warp threads and weft threads in the load carrying section.

17. The conveyor belt according to claim 16, wherein the first edge section and the second edge section of the conveyor belt do not extend across more than 30% of the total width of the conveyor belt.

18. The conveyor belt according to claim 16, wherein the belt is about 520 inches (13,208 mm) long.

19. The conveyor belt according to claim 16, wherein the belt is about 23 (584.2 mm) inches wide.

20. The conveyor belt according to claim 16, wherein the first edge section and the second edge section each have a width of no more than 10 inches (254 mm).

* * * * *